United States Patent [19]

Suzuki

[11] Patent Number: 4,802,105

[45] Date of Patent: Jan. 31, 1989

[54] PULSE WIDTH MODULATOR FOR A PRINTING APPARATUS

[75] Inventor: Kiyosuke Suzuki, Saitama, Japan

[73] Assignee: Sony Corporation, Tokyo, Japan

[21] Appl. No.: 193,563

[22] Filed: May 13, 1988

[30] Foreign Application Priority Data

May 19, 1987 [JP] Japan .................................. 62-122118

[51] Int. Cl.$^4$ .............................................. G01D 15/00
[52] U.S. Cl. ...................................... 364/519; 358/296
[58] Field of Search ................................ 364/518–523; 346/154; 358/283, 284, 296, 298, 280

[56] References Cited

U.S. PATENT DOCUMENTS 4,737,923 4/1988 Matsuzaki et al. .................. 364/519
4,757,462 7/1988 Sato et al. ........................... 364/519

Primary Examiner—Arthur G. Evans
Attorney, Agent, or Firm—Lewis H. Eslinger; Donald S. Dowden

[57] ABSTRACT

A head drive system for printer apparatus for gray scale recording divides digital data representing each pixel into upper and lower groups of bits respectively defining upper bit data and lower bit data. The lower bit data is compared with periodic reference data. On the basis of the comparison, binary data is derived and added to the upper bit data to form output data for controlling a printer head. The invention combines the advantages of density modulation and area modulation and at the same time enables high speed data processing and printing.

16 Claims, 1 Drawing Sheet

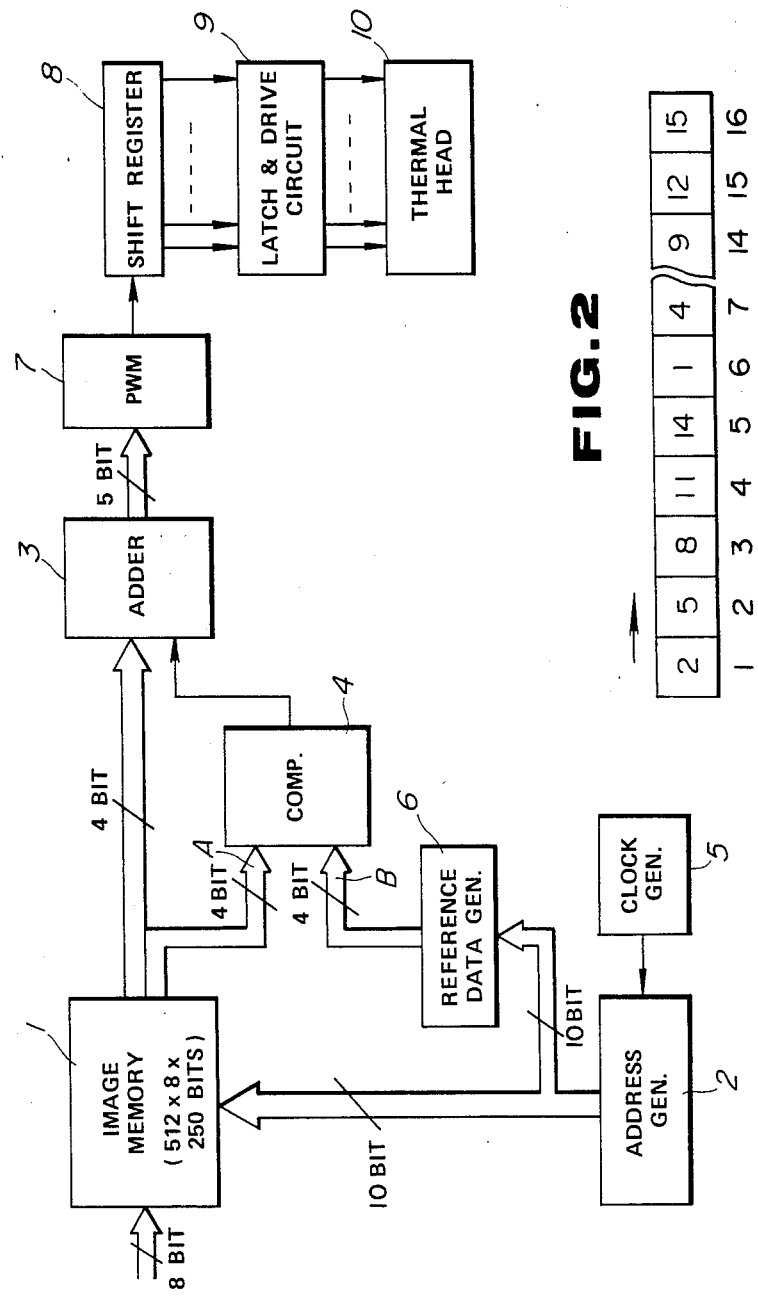

PULSE WIDTH MODULATOR FOR A PRINTING APPARATUS

BACKGROUND OF THE INVENTION

1. Field of the Invention

The present invention relates generally to printer apparatus and more particularly to gray scale recording type printer apparatus having a head drive system that can perform gray scale recording at high speed.

2. Description of the Prior Art

Either density modulation or area modulation is usually employed in conventional gray scale recording. In density modulation, each picture element or pixel is constituted by a single printing dot, and gray levels of an image to be printed are determined by adjusting the tone of each pixel. Density modulation can provide high resolution of the printed image. On the other hand, when a relatively great number of tones are to be printed, degradation of image quality tends to occur because of an unevenness or abrupt change of tone which is due to unevenness or roughness of the printing paper. Such tendency is increased if a substantially smooth printing paper is required, as in a thermal printer system.

On the other hand, in the case of area modulation, each pixel is constituted by a plurality of printing dots, and the tone is determined by the number of printing dots. Area modulation typically does not cause unevenness or abrupt change of tone such as that occurring in density modulation. However, since in area modulation each pixel is constituted by a plurality of printing dots, the pixels tend to be too large to provide high resolution.

In order to provide better print quality, there has been proposed a method combining density modulation and area modulation in gray scale recording. In the proposed system, a plurality of printing dots are employed to constitute each pixel (as in area modulation), and the tone of each printing dot is modulated (as in density modulation). In this combined process a printed image of better quality can be obtained in comparison with a method employing density modulation alone or area modulation alone. However, in the combined method, extremely complex signal processing for each pixel of the original image is required, and the image data processing speed is severely limited by the complexity of the signal processing.

OBJECTS AND SUMMARY OF THE INVENTION

An object of the invention is to overcome the limitations of the prior art indicated above and to provide gray scale recording type printer apparatus that produces images of exceptionally high quality.

Another object of the invention is to provide printer apparatus that can achieve rapid data processing for printing at higher speed.

Another object of the invention is to provide a printer head drive system that allows high speed data processing without causing degradation of image quality.

In order to accomplish the aforementioned and other objects, there is provided in accordance with the present invention apparatus for generating a drive signal for a printer head for printing an image in a plurality of lines, the apparatus comprising: image memory means; address generating means for generating address data supplied to the image memory means for sequentially reading out image data from the image memory means as upper bit data and lower bit data in parallel; reference data generating means connected to the address generating means for cyclically generating reference data in association with the address data; comparing means connected to the image memory means and the reference data generating means for making a comparison of the reference data with the lower bit data and producing a comparator output signal on the basis of the comparison; adding means connected to the image memory means and the comparing means for adding the upper bit data and the comparator output signal to produce a sum signal; and modulating means connected to the adding means for generating head drive signals in response to the sum signal.

Preferably, apparatus constructed in accordance with the invention is characterized also by the following advantangeous features.

The upper bit data consists of a given first number of bits and the lower bit data consists of a given second number of bits. Also, the image memory has a memory capacity of at least one line of the image data, and each of the data consists of the first and second numbers of bits.

The output of the comparing means is one bit, and the output from the adding means has a maximum number of bits equal to the first bit number plus one bit. The modulating means moreover includes a pulse width modulator responsive to the sum signal, and the sum signal consists of a number of bits which at maximum equals the given first number of bits plus one bit.

According to another aspect of the invention, a printer drive system is provided comprising: a printer head having at least one printing element; memory means connected to an image source and having memory addresses for storing image data relating to a plurality of pixels, the image data for each pixel being composed of a given first number of bits constituting a first data component and a given second number of bits constituting a second data component; address generator means for generating address data identifying memory addresses of the memory means for reading out image data stored therein; reference data generator means responsive to and synchronized with the address data for generating reference data which has a value cyclically varying according to a predetermined schedule; comparator means connected to the image memory means and the reference data generator means for simultaneously receiving the data component and the reference data and for making a comparison of the second data component with the reference data and generating a binary signal output based on the comparison; adder means connected to the image memory means for receiving the first data component and to the comparator means for receiving the binary signal output and producing a sum of the first data component and the binary signal output; and drive means connected to the adder means for generating head drive signals based on the sum signal.

In practice, the binary signal output is composed of a number of bits that is smaller than the given second number. Preferably, the binary signal output is a single bit of HIGH level when the second data component is greater than the reference data and of LOW level otherwise.

The sum signal has a value equal to the full sum of the first data component and the binary signal output. The driver means comprises modulating means connected to the adder means for transferring the head drive signal as serial data.

According to a further aspect of the invention, a printer drive system for gray scale recording of an image formed of a plurality of pixels comprises a printer head; image data source means having a plurality of addresses respectively storing image data of the pixels in digital form, the image data of each pixel being composed of a first data component and a second data component, the second data component being formed of a plurality of bits; reading means for accessing each address of the image data source means in a predetermined reading schedule; reference data generator means for generating reference data; converting means for comparing the second data component with the reference data to convert the second data component into a binary signal output having a number of bits less than the number of bits in the second data component; and drive signal generator means responsive to the first data component and the binary signal output for generating a drive signal to drive the printer head.

The reference data generator means comprises a predetermined reference data selecting schedule and periodically varies the reference data by selecting one of a plurality of preset value in order according to the schedule.

The drive signal generator means includes adder means for adding the first data component and the binary signal to produce a sum signal, modulation means for modulating the sum signal into a printer drive signal, and drive signal transferring means for transferring the printer drive signal to the printer head for driving the printer head. The pixels in the image are arranged in lines and the modulation means accumulates the drive signal for each of the lines and transfers the accumulated drive signal to the transferring means as serial data.

BRIEF DESCRIPTION OF THE DRAWINGS

The present invention will be understood more fully from the detailed description given below and from the accompanying drawings of the preferred embodiment of the invention, which, however, should not be taken to limit the invention to the specific embodiment but are for explanation and understanding only.

In the drawings:

FIG. 1 is a block diagram of the preferred embodiment of a printer head drive system of printer apparatus according to the present invention; and FIG. 2 is an explanatory illustration of periodic reference data to be utilized in the preferred embodiment of the printer head drive system.

DESCRIPTION OF THE PREFERRED EMBODIMENT

FIG. 1 shows the preferred embodiment of a printer head drive system for printer apparatus according to the present invention. The apparatus performs data conversion of original pixel data for every horizontal line.

In the illustrated embodiment, one field of an image to be printed is constituted by 250 horizontal lines, each of which is constituted by 512 pixels. The gray scale level of each pixel is represented by eight-bit data. In order to process the one field of image data, an image memory 1, which is a field memory for storing one field of image data, is provided with a memory capacity of at least (512×8×250) bits. The image memory 1 is connected to an image source (not shown) via an eight-bit bus line. Therefore, the image data is transmitted from the image source to the image memory 1 as eight-bit parallel data.

The image memory 1 is further connected to an address signal generator 2 which is designed to generate a ten-bit address signal. The address signal generator 2 is connected to a clock generator 5 that produces a clock signal. The address signal generator 2 counts the clock signal to produce the address signal. The signal generated by the address signal generator 2 identifies each horizontal line of the one field of image in the image memory 1 to sequentially read out the pixel data of the identified horizontal line as eight-bit parallel data.

The data of each pixel are divided into upper four-bit data and lower four-bit data A. The upper four-bit data are supplied to an adder 3, and the lower four-bit data A are supplied to a comparator 4. In order to transfer the eight-bit pixel data separately and in parallel to the adder 3 and the comparator 4, eight signal lines constituting an eight-bit bus line are separated into two sets of four lines each. The comparator 4 is connected also to a reference data generator 6 which is designed to produce periodically varying four-bit reference data B. The reference data generator 6 is, in turn, connected to the address signal generator 2 to receive the ten-bit address signal. The reference data generator 6 stores sixteen reference data, as illustrated in FIG. 2 in decimal notation, to be identified by the address signal. The reference data B in the reference data generator 6 are periodically and repeatedly read out in order.

The comparator 4 compares the lower four-bit data A from the image memory 1 with the reference data B from the reference data generator 6. The comparator 4 is designed to produce a HIGH level ("1") comparator output signal (binary signal output) when the lower four-bit data A are greater than the reference data B. On the other hand, the comparator 4 produces LOW level ("0") output signal when the lower four-bit data A are smaller than or equal to the reference data B. The comparator output signal thus produced by the comparator 4 is supplied to the adder 3.

The adder 3 adds the binary comparator signal to the upper four-bit data which is supplied directly from the image memory 1. The adder 3 is generally designed to supply four-bit data. However, when overflow of the data as a sum of the upper four-bit data and the comparator binary output signal occurs, the output of the adder 3 becomes five-bit data. In other words, the adder 3 is a full-adder.

The output of the adder 3 is fed to a pulse-width modulation (PWM) circuit 7. The PWM circuit 7 performs pulse-width modulation of the adder output to formulate printer drive data. By sequentially performing pulse-width modulation, the PWM circuit 7 formulates the printer drive data for each horizontal line of print as serial data. The serial printer drive data for each horizontal line is hereinafter sometimes referred to as "one line drive data". The one line drive data is fed to a shift register 8 and registered in order.

A latch and drive circuit 9 is connected to the shift register 8 to latch the one line drive data to apply drive voltage to a thermal printer head 10. In the illustrated embodiment, the printer head 10 comprises a thermal type line printer having an array of heat elements corresponding in number to the number of printing dots in one horizontal line. Since in the illustrated embodiment one horizontal line is composed of 512 printing dots, 512 heat elements are provided in the printer head 10.

In operation, the image data is transferred to and stored in the image memory 1 one field at a time. Each memory block storing image data of one horizontal line is identified by a ten-bit address signal from the address signal generator 2 and accessed in order. The upper four-bit data of each pixel of the one line drive data read out from each memory block are supplied directly to the adder 3. On the other hand, lower four-bit data A of each pixel of the one line drive data are supplied to the comparator 4 to be compared with the reference data B received from the reference data generator 6. An example of the reference data B is shown in FIG. 2. As set forth above, the comparator 4 produces a HIGH level comparator output signal when and only when the lower four-bit data A are greater than the reference data B. Since the reference data change periodically, the output signal of the comparator 4 smoothes tone differences as explained below with reference to the table.

The adder 3 receives the one-bit comparator output signal for adding to the upper four-bit data from the image memory 1 to form four- or five-bit data for each pixel. The four- or five-bit data produced by the adder 3 are fed to the PWM circuit 7 as parallel data through a five-bit bus line. The PWM circuit 7 thus receives continuously input data for one horizontal line to perform pulse width modulation to generate a predetermined number of tones of printer drive data for each pixel. In the illustrated embodiment, the PWM circuit 7 is designed to produce printer drive data consisting of any of 32 tones for each printing dot. The PWM circuit 7 then transfers to the shift register 8 the printer drive data of the first tone and subsequently the printer drive data of the second tone and the printer drive data of each of the other tones as serial data.

After all of the printer drive data of the first tone for one horizontal line have been transferred from the PWM circuit 7 to the shift register 8, the latch and drive circuit 9 latches the transferred first tone printer drive data and applies the printing voltage to the corresponding heat elements of the printer head 10. Simultaneously with the latching of the first tone printing data by the latch and drive circuit 9, the PWM circuit 7 transfers the printer drive data of the second tone of the same horizontal line to the shift register 8. After all of the second tone printer drive data have been transferred as serial data from the PWM circuit 7 to the shift register 8, the latch and drive circuit 9 latches the second tone printer drive data of the shift register and drives the printer head 10 on the basis thereof. The process set forth above is repeated for 30 more cycles (32 cycles altogether) to drive the printer head to print the respective tones represented by the printer drive data.

In other words, the PWM circuit 7 classifies the gray scale into n tone levels, where n is a positive integer such as 32, and sequentially transfers all drive signals representing a first tone level, then all drive signals representing a second tone level, and so on to all drive signals representing the n-th tone level.

In the illustrated embodiment, since eight-bit image data is converted into four- or five-bit data, the time required to transfer the printer drive data as serial data from the PWM circuit 7 to the shift register 8 is substantially shortened. In addition, the upper four bits provide sufficient information for definition or resolution of the image, while the lower four bits as converted into one bit (in the nature of dither processed data) prevent substantial tone jumps and thus prevent degradation of the printed image which would otherwise occur because of unevenness or roughness of the printing page, etc. The upper four-bit data are particularly effective in the high gray level image region, where a greater number of tones have to be represented and where high definition or resolution is required. On the other hand, the lower four-bit data are particularly effective in the low gray level image region, where preventing abrupt tone jumps is more important than image definition or resolution.

Even though each printing dot has one of only 32 tones in gray scale as described above, the printed image produced by the apparatus of the present invention appears to the eye as though it were composed of as many as 256 tones.

In order to explain the operation of the invention more clearly, a data table is set out below wherein the data for each pixel are assumed to consist of four bits.

The four-bit pixel data are divided into upper two-bit data and lower two-bit data A, and the lower two-bit data A are compared with two-bit reference data B. The data in the table are written in decimal notation for purposes of explanation.

As the table shows, the two-bit reference data are repeatedly supplied to the comparator as 1,3,2,0,1,3,2,0, ... in order, and even if the original pixel data have in a certain region a constant value (for example, seven as shown at a portion A in the table), the output data are modified as shown. That is, the constant level of the original data corresponds to a plurality of output data.

While the illustrated embodiment employs a PWM circuit for pulse width conversion of the image data, it is possible to employ a digital-to-analog (D/A) converter that generates a printer drive signal by digital-to-analog conversion of the image data. In addition, though the illustrated embodiment divides the image data of each pixel into equal numbers of bits of upper and lower data, the number of bits forming the upper and lower data is variable in any proportion.

Since the present invention reduces the time required for data transfer, data processing in the printer operation can be substantially speeded up. Furthermore, according to the invention, by dividing the image data into an upper bit component and a lower bit component and utilizing the upper bit component "as is" and the lower bit component in a converted form that accomplishes a dither function, satisfactorily high image definition can be provided by the upper bit component and satisfactorily smooth tone variation can be ensured by the lower bit component.

While the present invention has been disclosed in terms of the preferred embodiment in order to facilitate an understanding of the invention, the invention can be embodied in various ways. Therefore, the invention includes all possible embodiments and modifications that are within the scope of the appended claims.

TABLE

| Pixel Data | 1 | 2 | 3 | 6 | 8 | 6 | 5 | 4 | 10 | 12 | 13 | 15 | 13 | 12 | 11 | 7 | 6 | 5 | 7 | 7 | 7 | 7 | 7 | 7 | 7 |

TABLE-continued

| | | | | | | | | | | | | | | | | | | | A | | | | | | |
|---|---|---|---|---|---|---|---|---|---|---|---|---|---|---|---|---|---|---|---|---|---|---|---|---|---|
| Ref. Data B | 1 | 3 | 2 | 0 | 1 | 3 | 2 | 0 | 1 | 3 | 2 | 0 | 1 | 3 | 2 | 0 | 1 | 3 | 2 | 0 | 1 | 3 | 2 | 0 | 1 | 3 |
| Lower Bit A | 1 | 2 | 3 | 2 | 0 | 2 | 1 | 0 | 2 | 0 | 1 | 3 | 1 | 0 | 3 | 3 | 2 | 1 | 3 | 3 | 3 | 3 | 3 | 3 | 3 | 3 |
| Comp. Output | 0 | 0 | 1 | 1 | 0 | 0 | 0 | 0 | 1 | 0 | 0 | 1 | 0 | 0 | 1 | 1 | 1 | 0 | 1 | 1 | 1 | 0 | 1 | 1 | 1 | 0 |
| Output Data | 0 | 0 | 1 | 2 | 2 | 1 | 1 | 1 | 3 | 3 | 3 | 4 | 3 | 3 | 4 | 2 | 2 | 1 | 2 | 2 | 1 | 2 | 2 | 2 | 1 |

I claim:

1. Apparatus for generating a drive signal for a printer head for printing an image in a plurality of lines, said apparatus comprising:
   image memory means;
   address generating means for generating address data supplied to said image memory means for sequentially reading out image data from said image memory means as upper bit data and lower bit data in parallel;
   reference data generating means connected to said address generating means for cyclically generating reference data in association with said address data;
   comparing means connected to said image memory means and said reference data generating means for making a comparison of said reference data with said lower bit data and producing a comparator output signal on the basis of said comparison;
   adding means connected to said image memory means and said comparing means for adding said upper bit data and said comparator output signal to produce a sum signal; and
   modulating means connected to said adding means for generating head drive signals in response to said sum signal.

2. Apparatus as set forth in claim 1, wherein said upper bit data consists of a given first number of bits and said lower bit data consists of a given second number of bits.

3. Apparatus as set forth in claim 2, wherein said image memory means has a memory capacity of at least one line of said image data, and each of said data consists of said first and second numbers of bits.

4. Apparatus as set forth in claim 3, wherein said output of said comparing means is one bit, and said output from said adding means has a maximum number of bits equal to said first bit number plus one bit.

5. Apparatus as set forth in claim 3, wherein said modulating means includes a pulse width modulator responsive to said sum signal and said sum signal consists of a number of bits which at maximum equals said given first number of bits plus one bit.

6. A printer drive system comprising:
   a printer head having at least one printing element;
   memory means connected to an image source and having memory addresses for storing image data relating to a plurality of pixels, the image data for each pixel being composed of a given first number of bits constituting a first data component and a given second number of bits constituting a second data component;
   address generator means for generating address data identifying memory addresses of said memory means for reading out image data stored therein;
   reference data generator means responsive to and synchronized with said address data for generating reference data which has a value cyclically varying according to a predetermined schedule;
   comparator means connected to said image memory means and said reference data generator means for simultaneously receiving said second data component and said reference data and for making a comparison of said second data component with said reference data and generating a binary signal output based on said comparison;
   adder means connected to said image memory means for receiving said first data component and to said comparator means for receiving said binary signal output and producing a sum signal of said first data component and said binary signal output; and
   drive means connected to said adder means for generating head drive signals based on said sum signal.

7. A printer drive system as set forth in claim 6, wherein said binary signal output is composed of a number of bits that is smaller than said given second number.

8. A printer drive system as set forth in claim 7, wherein said binary signal output is a single bit of HIGH level when said second data component is greater than said reference data and of LOW level otherwise.

9. A printer drive system as set forth in claim 7, wherein said sum signal has a value equal to the full sum of said first data component and said binary signal output.

10. A printer drive system as set forth in claim 6, wherein said drive means comprises modulating means connected to said adder means for transferring said head drive signal as serial data.

11. A printer drive system for gray scale recording of an image formed of a plurality of pixels, said printer drive system comprising:
   a printer head;
   image data source means having a plurality of addresses respectively storing image data of said pixels in digital form, said image data of each pixel being composed of a first data component and a second data component, said second data component being formed of a plurality of bits;
   reading means for accessing each address of said image data source means in a predetermined reading schedule;
   reference data generator means for generating reference data;
   converting means for comparing said second data component with said reference data to convert said second data component into a binary signal output having a number of bits less than the number of bits in said second data component; and
   drive signal generator means responsive to said first data component and said binary signal output for generating a drive signal to drive said printer head.

12. A printer drive system as set forth in claim 11, wherein said reference data generator means comprises a predetermined reference data selecting schedule and periodically varies said reference data by selecting one of a plurality of preset values in order according to said schedule.

13. A printer drive system as set forth in claim 11, wherein said binary signal output is a single bit of HIGH level when said second data component is greater than said reference data and of LOW level otherwise.

14. A printer drive system as set forth in claim 11, wherein said drive signal generator means includes adder means for adding said first data component and said binary signal output to produce a sum signal, modulation means for modulating said sum signal into a printer drive signal, and drive signal transferring means for transferring said printer drive signal to said printer head for driving said printer head.

15. A printer drive system as set forth in claim 14, wherein said pixels in said image are arranged in lines and said modulation means accumulates said drive signal for each of said lines and transfers said accumulated drive signal to said transferring means as serial data.

16. A printer drive system as set forth in claim 15, wherein said modulation means classifies said gray scale into n tone levels, where n is a positive integer, assigns a tone level to each pixel, and sequentially transfers all drive signals representing a first tone level, then all drive signals representing a second tone level, and so on to all drive signals representing the n-th tone level.

* * * * *